(12) United States Patent
Stevens

(10) Patent No.: US 11,492,511 B2
(45) Date of Patent: Nov. 8, 2022

(54) THIN, LIGHTWEIGHT MARINE TRACTION SURFACING

(71) Applicant: Linda M Stevens, Merrill, WI (US)

(72) Inventor: Jeffrey T Stevens, Merrill, WI (US)

(73) Assignee: Linda Stevens

( * ) Notice: Subject to any disclaimer, the term of this patent is extended or adjusted under 35 U.S.C. 154(b) by 288 days.

(21) Appl. No.: 16/874,546

(22) Filed: May 14, 2020

(65) Prior Publication Data

US 2020/0270477 A1 Aug. 27, 2020

(51) Int. Cl.
| | |
|---|---|
| C09D 175/04 | (2006.01) |
| B05D 1/12 | (2006.01) |
| B05D 5/02 | (2006.01) |
| B05D 1/28 | (2006.01) |
| B63B 3/48 | (2006.01) |
| B05D 7/26 | (2006.01) |

(52) U.S. Cl.
CPC ............. *C09D 175/04* (2013.01); *B05D 1/12* (2013.01); *B05D 1/28* (2013.01); *B05D 5/02* (2013.01); *B05D 7/26* (2013.01); *B63B 3/48* (2013.01); *B05D 2401/32* (2013.01); *B63B 2231/40* (2013.01)

(58) Field of Classification Search
None
See application file for complete search history.

(56) References Cited

U.S. PATENT DOCUMENTS

| | | | |
|---|---|---|---|
| 3,801,421 A | 4/1974 | Allen et al. | |
| 3,869,421 A | 3/1975 | Sapp et al. | |
| 4,420,513 A | 12/1983 | Coke et al. | |
| 4,501,783 A * | 2/1985 | Hiragami | D06N 7/0055 428/327 |
| 5,494,729 A | 2/1996 | Henry et al. | |
| 5,750,625 A | 5/1998 | Medsker et al. | |
| 6,197,377 B1 * | 3/2001 | Boogaard | A47K 3/003 427/407.1 |
| 8,178,625 B2 | 5/2012 | Ellul et al. | |
| 8,962,750 B2 | 2/2015 | Saluti | |
| 10,294,338 B2 | 5/2019 | Chung et al. | |
| 2003/0090016 A1 | 5/2003 | Petrovic et al. | |
| 2004/0063844 A1 * | 4/2004 | Urs | C08G 18/4277 524/492 |
| 2004/0126557 A1 | 7/2004 | Thiele et al. | |
| 2005/0245681 A1 | 11/2005 | McGrath et al. | |
| 2008/0033089 A1 | 2/2008 | Ellul et al. | |

\* cited by examiner

*Primary Examiner* — Michael P. Rodriguez
(74) *Attorney, Agent, or Firm* — Lawrence Pope

(57) ABSTRACT

The disclosure concerns a thin light weight essentially water impervious UV resistant non-abrasive traction imparting surfacing material for marine applications adhered to a solid non-elastomeric structural surface and a process for production of it. The surfacing material is a between about 2 and 4 mm thick flexible cured layer of a trowelable adhesive sealant into which were deeply embedded sufficient elastomeric granules with a maximum dimension between about 0.5 and 4 mm to cover the surface of the adhesive sealant layer before it cured. It is prepared by applying an evenly distributed layer of the adhesive sealant onto the structural surface with a trowel or similar means. Then elastomeric granules with a maximum dimension between about 0.5 and 4 mm are distributed on said layer to essentially cover the surface and then deeply embedded into the adhesive sealant layer. A rolling pin may be used to embed the granules.

20 Claims, 3 Drawing Sheets

THIN, LIGHTWEIGHT MARINE TRACTION SURFACING

BACKGROUND OF THE INVENTION

Many of the surfaces upon which people tread should, for safety and convenience sake, have enhanced traction. This is commonly reflected in signs or notices that warn "slippery when wet". Some of these surfaces are in locations where they are exposed to environmental conditions including exposure to harsh weather including extremes of hot and cold and the UV radiation from sunlight. In addition they are frequently subjected to cycles of being wetted and dried. In some cases there is a desire that such surfaces should have aesthetic appeal. Included among the surfaces that would benefit from improved traction surfaces are boat decks and piers, particularly those with inclines.

This need has been addressed with various types of surfacing materials that impart reduced slip under wet and dry conditions. These approaches include carpet, vinyl and textured or aggregate infused paints. It is desirable that such surfacing materials not impose an undue risk of injury from being unduly abrasive to human skin. It is also desirable that these surfacing materials display durability under harsh environmental conditions, be easy to clean and be readily repairable.

In many situations it is advantageous that the surfacing material be decorative as well as functional and maintain its decorative appearance despite being exposed to the elements. In certain situations such, as the decking of small watercraft, it is advantageous that the weight per unit area imparted by the surfacing material be minimized.

SUMMARY OF THE INVENTION

The present invention involves a thin light weight essentially water impervious UV resistant non-abrasive traction imparting surfacing material suitable for marine applications adhered to a solid non-elastomeric structural surface. The surfacing material comprises a between about 2 and 4 mm thick flexible cured layer of trowelable curable UV resistant adhesive sealant that cures to yield an essentially water impervious elastomeric layer with a high lap strengths against common structural materials into which were deeply embedded sufficient elastomeric granules with a maximum dimension between about 0.5 and 4 mm to essentially fairly uniformly cover the surface of the adhesive sealant layer before said adhesive sealant layer had cured. The adhesive sealant may advantageously be a one component moisture curable polyurethane. The surfacing material may conveniently have a unit weight between about 0.36 and 0.6 lb/ft$^2$, especially when the surfacing material is covered by a clear polyurethane lacquer such that the traction imparting property is not obviated. The structural surface may be any common structural material such as wood, metal or rigid polymer. It may conveniently be a portion of the deck of a small water craft. The cured polyurethane adhesive sealant is elastic and the moisture curable polyurethane adhesive sealant advantageously has a viscosity suitable for paste extrusion.

The present invention involves a process for the production of a thin light weight essentially water impervious UV resistant non-abrasive traction imparting surfacing material suitable for marine applications adhered to a solid non-elastomeric structural surface. A trowelable curable UV resistant adhesive sealant that cures to yield a flexible adhesive sealant firmly adhered with a high lap strength onto the solid non-elastomeric structural surface is applied by troweling or a mechanically equivalent technique to yield an evenly distributed layer on the solid non-elastomeric structural surface. Elastomeric granules with a maximum dimension between about 1 and 4 mm are distributed on to said layer to essentially cover the surface. The elastomeric granules are then deeply embedded in the layer of curable adhesive sealant and the surface of the layer is leveled. The curable adhesive sealant is then allowed to cure. The adhesive sealant may advantageously be a one component moisture curable polyurethane. Conveniently the elastomeric granules may be deeply embedded by the application of a roller that also serves to level the layer with the embedded granules and the roller may be reapplied to further level the surface once excess, non-embedded granules have been removed and before the moisture curable polyurethane adhesive sealant is allowed to cure. A trowel that has V notches of about 3/32 inch may be used to apply the moisture curable polyurethane adhesive sealant. This layer of polyurethane adhesive sealant with deeply embedded elastomeric granules may be applied such that surface imperfections in the non-elastomeric structural surface are hidden from view. Advantageously a clear UV stable polyurethane lacquer may be applied over the layer with the embedded elastomeric granules in such a way as not to obviate the traction imparting property but to entirely cover said layer. This lacquer may be applied by spaying or with a paint roller.

DETAILED DESCRIPTION

Figure 1:
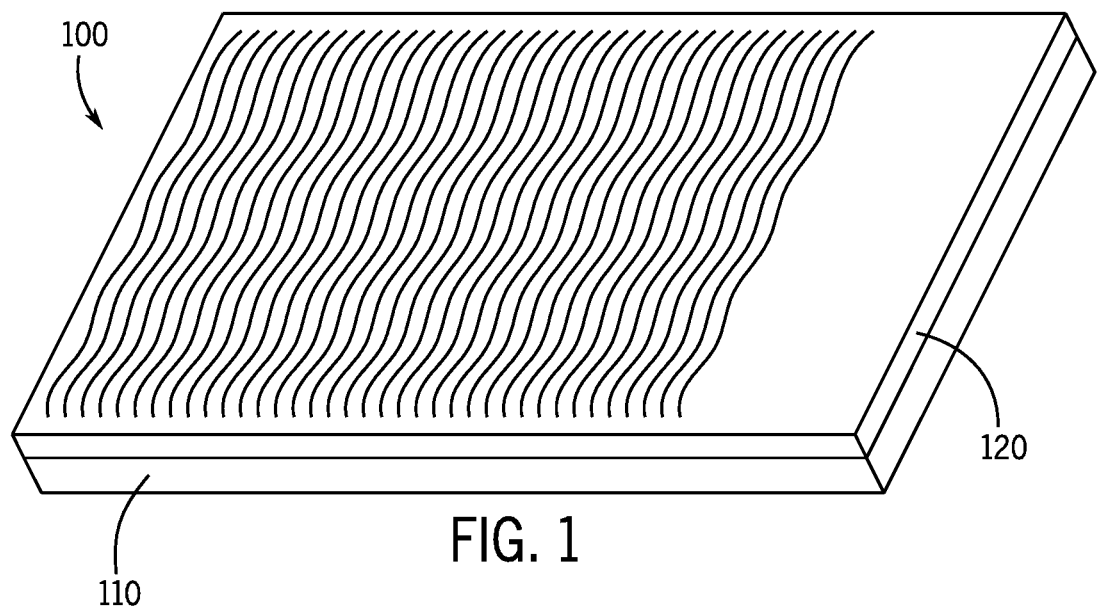
FIG. 1 is a perspective view of the first stage of the adhering of the surfacing material to a solid non-elastomeric structural surface.

FIG. 1 illustrates the first stage in the preparation of a traction imparting marine surfacing material 100. A polyurethane adhesive sealant 120 has been troweled onto a solid non-elastomeric structural surface 110.

Figure 2:
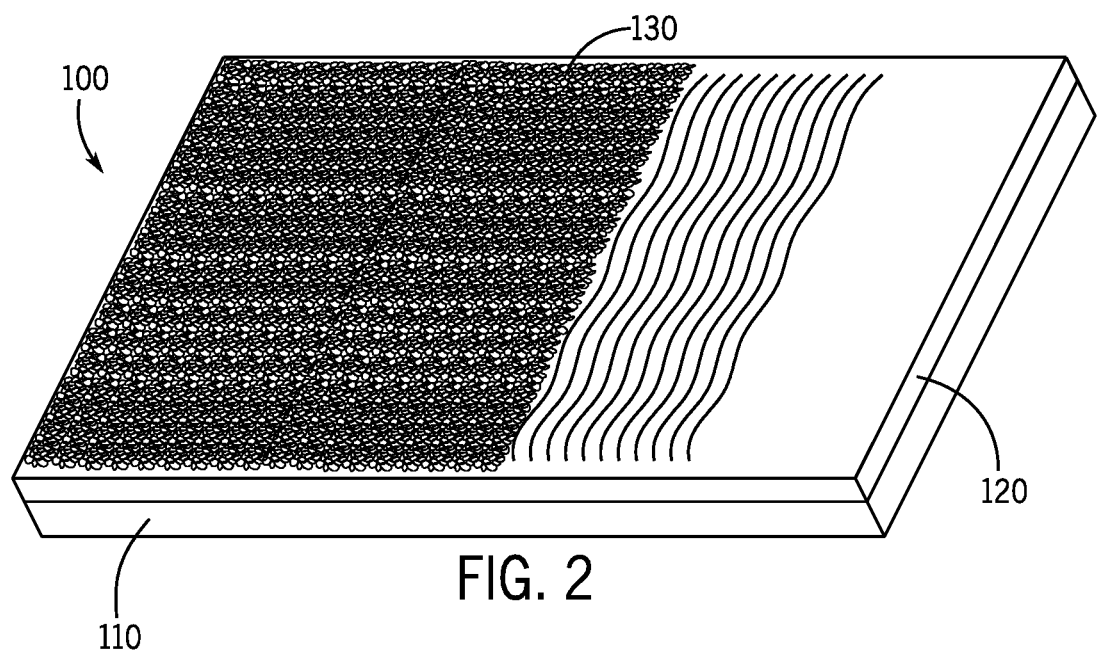
FIG. 2 is a perspective view of the partial completion of second stage of the adhering of the surfacing material to a solid non-elastomeric structural surface.

FIG. 2 illustrates the partial application of angular elastomeric granules 130 onto the troweled on polyurethane adhesive sealant 120. which is turn is adhered to the solid non-elastomeric structural surface 110.

Figure 3:
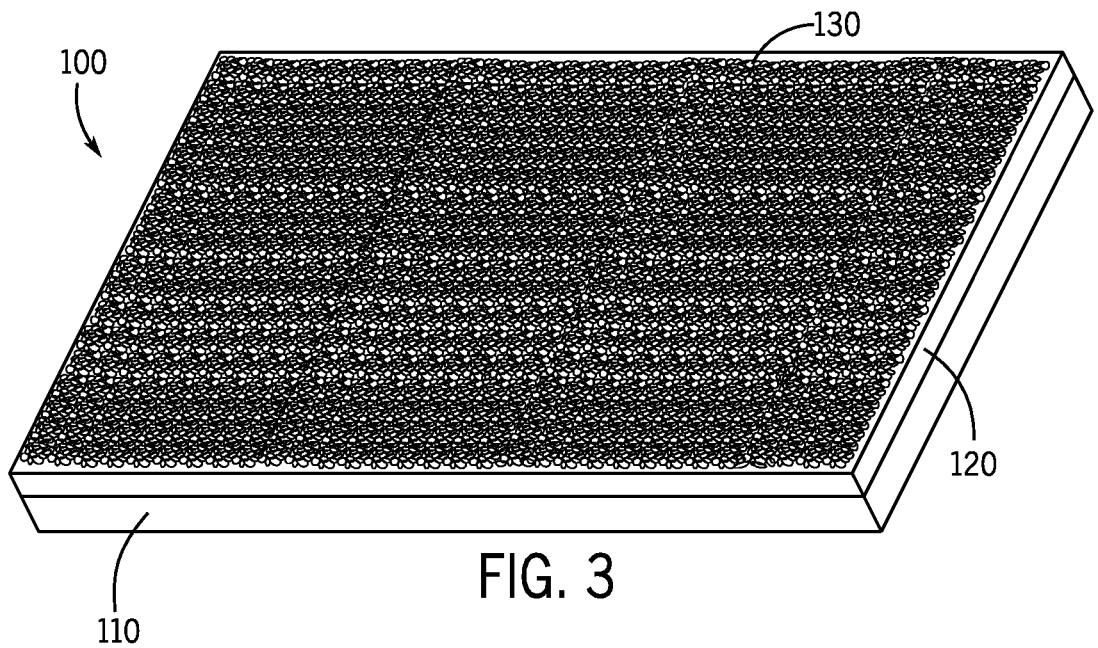
FIG. 3 is a perspective view of the full completion of second stage of the adhering of the surfacing material to a solid non-elastomeric structural surface.

FIG. 3 illustrates the angular elastomeric granules 130 entirely covering the troweled on polyurethane adhesive sealant 120 which is turn is adhered to the solid non-elastomeric structural surface 110.

Figure 4:
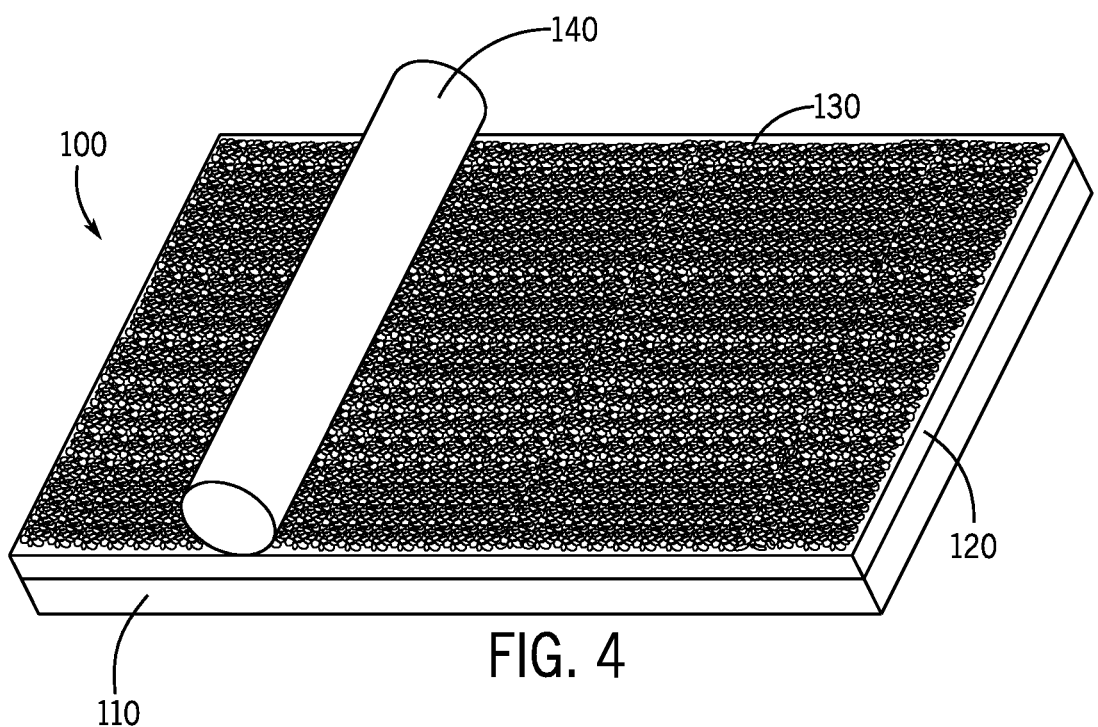
FIG. 4 is a perspective view of the third stage of the adhering of the surfacing material to a solid non-elastomeric structural surface.

FIG. 4 illustrates the process of deeply embedding the angular elastomeric granules 130 into the troweled on polyurethane adhesive sealant 120 using a roller 140.

Figure 5:
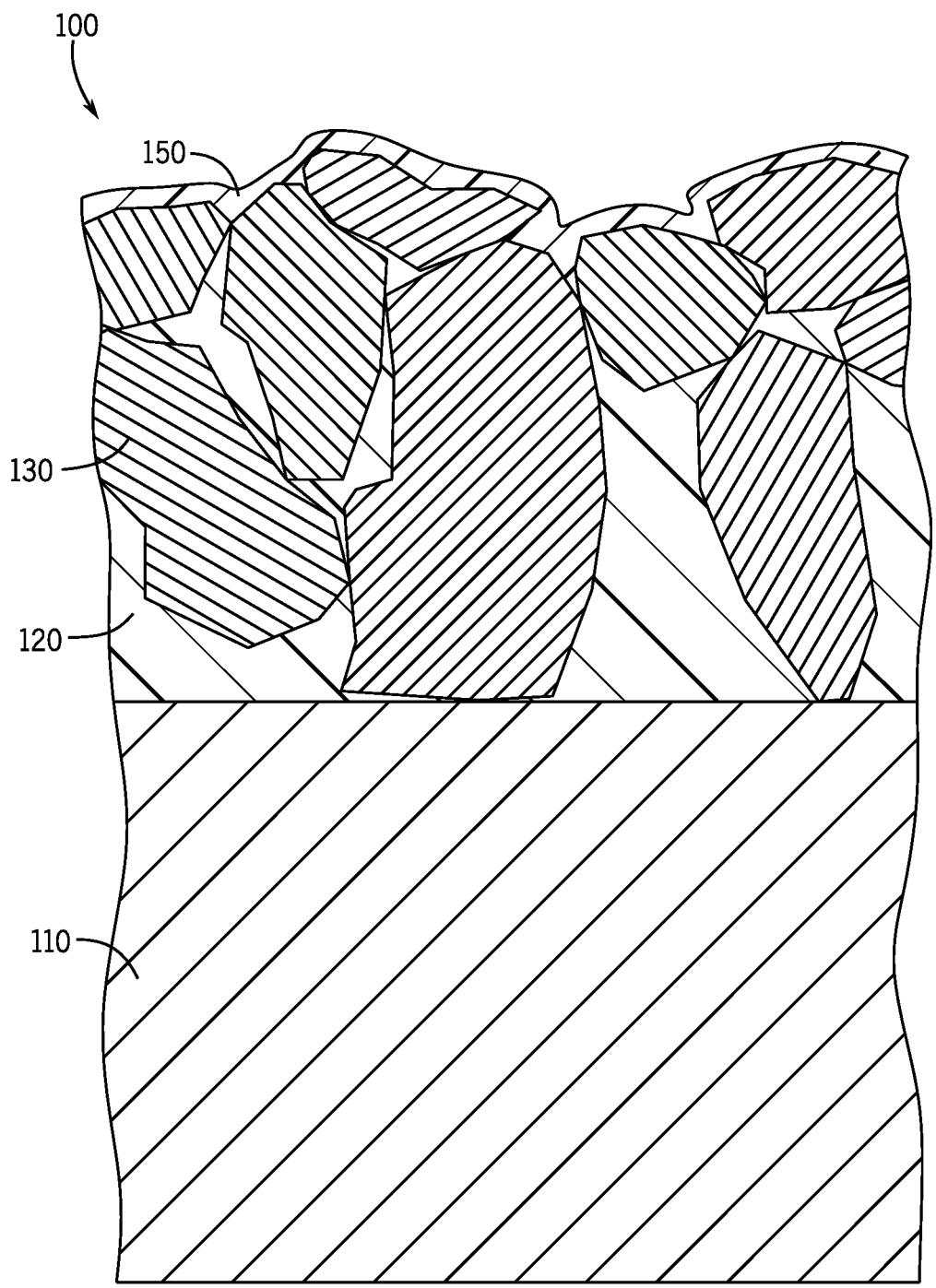
FIG. 5 is a vertical cross-section through the three component surfacing material.

FIG. 5 illustrates a finished traction imparting marine surfacing material 100 adhered to a solid non-elastomeric structural surface 110. The angular elastomeric granules 130 have been covered with a polyurethane lacquer 150 in such a way that they still provide an irregular non-planer traction imparting surface.

The curable adhesive sealant should have a consistency that allows it to be applied with a trowel, preferably a consistency that maintains the ridges and valleys obtained from the use of a notched trowel after application. Upon curing should firmly adhere to a wide variety of clean substrates including various metals, including galvanized steel, stainless steel, cold rolled steel, and aluminum, wood, including particle board and plywood, glass, concrete, masonry, rubbers, fiberglass and fiber reinforced plastics, thermoset plastics such as polyurethane, polyester and epoxies and thermoplastics, such as ABS, nylon and PVC. Preferably it has a lap shear strength after 30 days at room temperature of greater that 100 psi, has a Shore a hardness after 30 days at room temperature of greater than about 40 and has an ultimate elongation after 30 days at room temperature of greater than about 300%. It is advantageous if it has a viscosity that qualifies it as a paste extrusion grade or a gum grade and it is convenient if it is non-sagging. It is advantageous if it can be readily sanded. It is advantageous if it has a reasonably quick rising cure curve reaching a tack free condition in under about six hours, preferably displaying skin formation in about an hour or less. It is convenient if it cures such that no bubbles are trapped in the cured layer. It is advantageous if it has an initial set time of about four hours or less. It is preferably a one component moisture curable polyurethane, with homopolymers of 4,4' methylene diphenyl diisocyanate being particularly convenient. A pigmented polyurethane adhesive sealant is convenient for both readily visualizing the spread of the sealant as it is applied and for obscuring surface imperfections in the underlying structural surface such as screw heads, seams and gouges. It should cure to yield an essentially liquid water impervious layer and it should be rated as resistant to deterioration from exposure to UV radiation. Among the one component moisture curable polyurethanes that are suitable are Silaprene SolidSeal sold by Royal Adhesives of South Bend, Ind., DAP Premium Polyurethane Construction Adhesive Sealant sold by DAP products of Baltimore, Md., 3M Polyurethane sealant 540, 3M Polyurethane Adhesive Sealant 551 and 3M Marine Adhesive/Sealant Fast Cure 5200 sold by 3M of St. Paul, Minn. and comparable products. Other suitable adhesive sealants include two component polyurethanes and other polymeric curable adhesive sealants with the appropriate consistency, cure curve, adhesion and cured physical properties.

The elastomeric granules should be essentially non-abrasive to human skin when embedded in the polyurethane adhesive sealant with a portion exposed above the adhesive sealant. It is advantageous if they have a maximum size distribution between about 0.5 mm and 4 mm, preferably between about 0.5 and 2.5 mm. It is convenient for the traction imparting effect if the granules have an angular shape such as that obtained from shredding rubber as opposed to a rounded shape. Among the suitable granules are those made of ethylene propylene diene (EPDM) elastomer. Preferably the granules are of the type know as thermoplastic vulcanizates (TPV). Suitable TPV's are described in U.S. Pat. Nos. 5,750,625 and 8,178,625, both incorporated by reference. Conveniently these granules may have one or more decorative colors, where decorative colors refer to colors on the color wheel and does not include white, black or grey. It is advantageous if these granules are resistant to deterioration from exposure to UV radiation from sunlight. Advantageously the TPV granules have a Shore A hardness of about 55 or greater and an elongation at break of greater than about 300%. Among the suitable TPV granules are those sold by American Recycling Center of Owosso, Mich. as Rosehill TPV and comparable products. Among the suitable EPDM granules are those sold by Ultimate RB of McMinnville, Oreg. and Delphos, Ohio, those EPDM rubber granules sold by Fairmont Industries Sdn Bhd of Klang, Malaysia and comparable products.

The polyurethane lacquer that is optionally applied over the elastomeric granules should have a low enough viscosity that it can be applied without building up to the point that the granules no longer provide a traction enhancement. A viscosity of less than about 2,000 mPa-s. Thus while the lacquer should coat the portion of the granules projection out of the polyurethane adhesive sealant, it should not entirely fill the space between the projections of the granules out the base coat of adjacent particles. Advantageously the polyurethane lacquer should have a low enough viscosity to allow thinly coating the elastomeric granules. It is also advantageous if it is resistant to deterioration from exposure to UV radiation from sunlight. It is convenient if it is clear. Advantageously the polyurethane lacquer is a one component moisture curing polyurethane. An aliphatic polyurethane is preferred, especially one based upon hexamethylene-diisocyanate. It is preferred that the polyurethane lacquer is solvent free. Among the suitable polyurethane lacquers is the PremARC maintenance Gel sold by American Recycling Center of Owosso, Mich. and comparable products.

The solid non-elastomeric structural surface may be any of a wide variety of such surfaces made of a wide variety of materials that provide an essentially rigid surface. Among the suitable structural surfaces are boat or ship decks, marine docks, piers, outdoor decks, pool decks and related walking surfaces. Also included are trailer bed surfaces, Recreational Vehicle flooring as well as flooring and step tread surface coating for everything from golf carts to heavy equipment.

The polyurethane adhesive sealant should be applied using a technique that facilitates the formation of a fairly uniform thin layer. It is helpful to use a technique like troweling with a notched trowel that leaves a surface with valleys and peaks. It is advantageous to apply between about between about 0.05 and 0.1 lb/ft² of the polyurethane adhesive sealant with a coating weight of between about 0.06 and 0.08 lb/ft² being preferred. It is particularly preferred to apply the polyurethane adhesive sealant with a trowel with 3/32" V notches which results in a coating weight of about 0.075 lb/ft².

The elastomeric granules may be distributed over the surface of the uncured polyurethane adhesive sealant using any convenient technique that results in fairly uniformly distributing the granules on this surface. It is advantageous to apply between about between about 0.28 and 0.45 lb/ft² of the elastomeric granules.

The elastomeric granules should then be fairly deeply embedded into the uncured polyurethane adhesive sealant. This is conveniently done using a rolling pin or a similar device that fairly uniformly presses the elastomeric granules into the uncured polyurethane adhesive sealant. It is expected that at least some of these granules will penetrate to the bottom of the adhesive sealant layer. The object is to embed the granules deeply enough to prevent them from being easily removed by abrasion to the top surface of the layer with the embedded granules.

Any excess elastomeric granules may be removed from the surface by gently vacuuming them away. Other acceptable methods are to gently brush them away or gently blow them clear by using compressed air. Care must be taken in this step of the procedure to avoid displacing granules already partially imbedded in the as yet uncured coating material.

The roller or other device may then be conveniently reapplied to further level the top surface. In this regard, it is advantageous to avoid having the roller or other embedding device come into contact with the uncured polyurethane adhesive sealant on either application. This should avoid the roller or other application device from removing embedded granules.

It is advantageous to distribute and embed the granules before the polyurethane adhesive sealant has begun to skin over. Depending on the area of the solid non-elastomeric structural surface, it may be appropriate to apply the adhesive sealant in sections in order to allow enough time to complete the embedding and levelling steps before skin formation.

The optional polyurethane lacquer may be applied onto the top surface in any convenient manner such as spaying or rolling with a paint roller. It is convenient to use a coating weight between about 0.03 and 0.05 lb/ft$^2$. Care should be taken that at least some of the embedded granules still project out of the plane to provide a traction enhancing effect. Thus it is important to avoid completely filling all of the valleys between adjacent embedded granules.

The optional polyurethane lacquer may be applied before the polyurethane adhesive sealant has completely cured. If there is concern about adequate moisture reaching the polyurethane adhesive sealant, for instance because of low ambient humidity from a particularly cold day or desert conditions, the polyurethane adhesive sealant with the embedded granules may be lightly misted with water. In cases in which the polyurethane lacquer is moisture curable its layer may also be lightly misted with water to promote its curing under dry conditions.

The surfacing material will typically have a thickness between about 2 and 4 mm after application to the solid non-elastomeric structural surface and the embedding of the elastomeric granules.

The surfacing material is typically readily sanded. This means that damaged portions of the surfacing material can be sanded down to the non-elastomeric structural surface, allowing repairs to be readily effected by then reapplying the polyurethane adhesive sealant and embedding it with the elastomeric granules in the sanded down portions.

Wear of the optional polyurethane lacquer can be readily addressed by simply recoating those areas showing wear. The polyurethane lacquer typically imparts a brightening effect when elastomeric granules are employed that one or more decorative colors. This brightening effect can be readily restored by such a recoating.

The low unit weight of the surfacing material is of particular value when the solid non-elastomeric structural surface is a portion of a water craft, particularly a small water craft. The Coast Guard person capacity rating of smaller water craft is quite sensitive to the weight of the craft. For instance, "The Little River Boat" pontoon boat made by AquaCraft, Inc. of Merrrill, Wis., weighs about 260 lb and is rated for 4 people and 800 lb. It has about 64 ft$^2$ of decking. Its decking is typically covered in a carpeting material to impart decorative non-skid, non-slip properties The weight of these materials is approximately 20 lbs per 64 ft$^2$. If instead its decking were covered by the surfacing material of the present invention the added weight would range from about 3 lbs to about 18 lbs., discounting the weight of the carpet it would displace. Thus it could be employed without effecting the weight ratings of the boat.

The surfacing material enhances the safety of the structural surfaces to which it is applied by reducing the chance of slipping or sliding under both wet and dry conditions. At the same time it does not significantly increase the risk of abrasion to human skin. Because it resists deterioration from exposure to the outside elements including UV radiation from sunlight and rain and snow it is well suited for use in a marine environment. And because it is essentially water impervious it protects the underlying structural surface from water exposure and prevents the accumulation of water beneath the surfacing material.

WORKING EXAMPLE

The one component moisture curable polyurethane adhesive sealant Silaprene Solidseal 12154 from Royal Adhesives & Sealants of South Bend, Ind., was uniformly applied to the ½ inch thick five ply, treated, kiln dried marine plywood decking material used in the construction of the "Little River Boat" pontoon boat made by AquaCraft of Merrill, Wis., using a trowel with 3/32" V notches to yield a layer with ridges and valleys having a unit weight of 0.073 lb/ft$^2$. The Rosehill TPV elastomeric granules having a distribution of maximum dimensions between about 1 mm and 4 mm and having two shades of a decorative blue color sold by American Recycling Center of Owosso, Mich. were evenly distributed to cover the surface of the uncured polyurethane adhesive sealant before it had skinned over and then the granules were deeply embedded by the application of a rolling pin. Then the granules which had not been firmly embedded were removed with gentle sweeping resulting in an increase in unit weight of 0.366 lb/ft$^2$. The rolling pin was applied a second time to achieve a more level surface. This layer of embedded granules was then uniformly coated with a thin layer of the aliphatic one component moisture curable polyurethane lacquer PremARC Maintenance Gel sold by American Recycling Center of Owosso, Mich. using a smooth surface paint roller resulting in an increase in unit weight of 0.04 lb/ft$^2$. This top coated surfacing material with embedded particles had a unit weight of 0.48 lb/ft$^2$ and was firmly adhered to the plywood decking material. It was quite difficult to dislodge any of the embedded particles using a box cutter. The surface gave a good traction surface whether wet or dry and was not abrasive to human skin. It had a bright blue appearance and both shades of blue were readily apparent.

Surfacing material of this type was exposed to the weather over an extended time including the winter weather conditions in Merrill, Wis. and it displayed little or no signs of deterioration. In particular, several 8 inch by 9 inch samples of surfacing material were prepared as outlined above and intermittently exposed to weathering in shaded and unshaded locations in Merrill, Wis. during all four seasons over the course of about six years. The samples displayed little or no signs of deterioration. They are currently clean, dry, bright looking and remain well adhered to their substrates. They look very good.

One of these samples had been deliberately damaged before the weathering test to see if the damaged area would grow by deterioration during the weathering. The three component layer was scrapped to the plywood substrate within a ½ inch diameter patch. No deterioration was evident on the edges of this patch.

One of the 8 inch by 9 inch sample prepared by the application of the three components as described above and intermittently weathered for six year was subjected to a gasoline tolerance test. In particular, a 2½ inch inside diameter metal pipe was adhered to the surface using the Silaprene adhesive sealant and gasoline was poured into the pipe and allowed to stand for 24 hours. The gasoline was removed and the pipe was separated from the sample with a box cutter. After 18 hours the sample was washed with soap and water. The appearance of the area encompassed by the pipe was very similar to that of the surrounding area. No ill effect from the gasoline exposure was evident.

A different area of this 8 inch by 9 inch sample prepared was subjected to a water immersion test. In particular, the sample was stood on edge in about 3 inches of water for 48 hours. The application to the previously submerged edge of a moderate peeling force caused a thin layer of the exposed, water saturated, wood substrate to separate and peel away, said thin skin of the wooden substrate remaining firmly adhered to the three component surfacing material. The effect was evident from the exposed edge of the sample inward for about ½ inch, at which point the substrate under the three component surfacing material remained completely dry. When adjacent exposed areas were allowed to dry, the wood substrate regained its integrity and would no longer separate thus preventing the three component surfacing material from being peeled away.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An essentially water impervious UV resistant non-abrasive traction imparting surfacing material suitable for marine applications adhered to a solid non-elastomeric structural surface, said surfacing material comprising a between about 2 and 4 mm thick flexible cured layer of trowelable curable UV resistant adhesive sealant that cures to yield an essentially water impervious elastomeric layer with a lap shear strength greater than 689.5 kPa after 30 days at room temperature against aluminum into which were deeply embedded sufficient elastomeric granules with a maximum dimension between about 0.5 and 4 mm to cover the surface of the adhesive sealant layer before said adhesive sealant layer had cured.

2. The surfacing material of claim 1 wherein the adhesive sealant is a one component moisture curable polyurethane.

3. The surfacing material of claim 1 having a unit weight between about 1.76 and 2.93 kg/m².

4. The surfacing material of claim 1 wherein the structural surface is a part of a water craft rated for four people.

5. The surfacing material of claim 3 wherein the structural surface is a portion of the deck of a water craft rated for four people.

6. The surfacing material of claim 1 wherein the structural surface comprises wood, metal or rigid polymer.

7. The surfacing material of claim 1 covered by a clear polyurethane lacquer such that the traction imparting property is not obviated.

8. The surfacing material of claim 2 wherein the moisture curable polyurethane sealant is elastic and has a viscosity suitable for paste extrusion.

9. The surfacing material of claim 1 wherein the elastomeric granules have a maximum dimension between about 0.5 and 2.5 mm.

10. The surfacing material of claim 1 wherein the elastomeric granules are a thermoplastic vulcanizate.

11. The surfacing material of claim 10 wherein the granules have a decorative color and are UV resistant.

12. The surfacing material of claim 1 wherein the elastomeric granules were deeply embedded using a roller applied to the surface of the adhesive sealant.

13. A process for the production of an essentially water impervious UV resistant non-abrasive traction imparting surfacing material suitable for marine applications adhered to a solid non-elastomeric structural surface comprising:
   a. applying by troweling or a mechanically equivalent technique an evenly distributed layer of a trowelable curable UV resistant adhesive sealant that cures to yield a flexible adhesive sealant firmly adhered with a lap shear strength greater than 689.5 kPa against aluminum onto said solid non-elastomeric structural surface;
   b. distributing elastomeric granules with a maximum dimension between about 0.5 and 4 mm on said layer to cover the surface;
   c. deeply embedding the elastomeric granules in the layer of adhesive sealant;
   d. leveling the surface of said layer to yield a thickness of between about 2 and 4 mm; and
   e. allowing the curable adhesive sealant to cure.

14. The process of claim 13 wherein the adhesive sealant is a one component moisture curable polyurethane.

15. The process of claim 13 wherein the elastomeric granules are deeply embedded by the application of a roller that also serves to level the layer with the embedded granules.

16. The process of claim 15 wherein the roller is reapplied to further level the surface.

17. The process of claim 14 wherein a trowel is used to apply the moisture curable polyurethane adhesive sealant that has V notches of about 3/32 inch.

18. The process of claim 13 wherein a clear UV stable polyurethane lacquer is applied over the layer with the embedded elastomeric granules in such a way as not to obviate the traction imparting property but to entirely cover said layer.

19. The process of claim 18 wherein the polyurethane lacquer is applied by spaying or with a paint roller.

20. The product of the process of claim 13.

* * * * *